United States Patent [19]

Plapp

[11] 4,344,322

[45] Aug. 17, 1982

[54] DEVICE FOR AIR FLOW RATE MEASUREMENT IN THE AIR INTAKE TUBE OF AN INTERNAL COMBUSTION ENGINE

[75] Inventor: Günther Plapp, Filderstadt, Fed. Rep. of Germany

[73] Assignee: Robert Bosch GmbH, Stuttgart, Fed. Rep. of Germany

[21] Appl. No.: 156,956

[22] Filed: Jun. 6, 1980

[30] Foreign Application Priority Data

Jul. 20, 1979 [DE] Fed. Rep. of Germany ....... 2929427

[51] Int. Cl.$^3$ .............................................. G01F 1/68
[52] U.S. Cl. ....................................... 73/118; 73/204
[58] Field of Search ................................. 73/118, 204

[56] References Cited

U.S. PATENT DOCUMENTS 4,080,821 3/1978 Johnston ........................... 73/204 X
4,279,146 7/1981 Wessel et al. ......................... 73/118

Primary Examiner—Charles A. Ruehl
Attorney, Agent, or Firm—Edwin E. Greigg

[57] ABSTRACT

A device for air flow rate measurement in the air intake tube of an internal combustion engine which has at least two temperature-dependent resistors in different branches of a bridge circuit having closed-loop electric current control, and which is characterized in that the temperature-dependent resistors are embodied as hot wires, that a temperature above the aspirated air temperature is selected for both hot wires, and that the difference of the hot wire temperatures is held to a constant value. The purpose of the device is to provide air flow rate measurement which is as error-free as possible, even when the aspirated air temperature is fluctuating rapidly. An identically embodied suspension and fastening of the individual hot wires is given as an example for the spatial disposition of the individual hot wires in the air intake tube.

4 Claims, 2 Drawing Figures

DEVICE FOR AIR FLOW RATE MEASUREMENT IN THE AIR INTAKE TUBE OF AN INTERNAL COMBUSTION ENGINE

BACKGROUND OF THE INVENTION

The invention relates to a device for air flow rate measurement in the air intake tube of an internal combustion engine having at least two temperature-dependent hot wire resistors in different branches of a bridge, circuit having closed-loop electric current control.

A device is known (German Pat. No. 20 42 983) which has two temperature-dependent resistors in different bridge branches of a measurement bridge. In this device, one of the two temperature-dependent resistors is intended to detect the air throughput and the other resistor is intended to influence the measurement result in the sense of making a correction dependent on the aspirated air temperature. In the publication of the known air flow rate measuring device, it is expressly stated that the temperature-dependent resistor for detecting the aspirated air temperature should be held to the particular temperature value of the air flowing past it; that is, it has no heat output of its own. Because of the geometric embodiment and electric circuitry of the known air flow rate measuring device, there are sizable differences between the thermal time constants of the hot wire and of the temperature probe. When the aspirated air temperature changes, as does occur in actual driving operation, these differences cause relatively large errors in measurement.

SUMMARY AND ADVANTAGES OF THE INVENTION

The device for measuring the air flow rate in the air intake tube of an internal combustion engine according to the present invention comprises at least two temperature-dependent resistors embodied as hot wires and having closed-loop electric current control. A temperature is selected for both hot wires which is above the aspirated air temperature. The difference in the temperatures of the hot wires is held at a constant value.

It is an advantage of the invention over the prior art to provide a system in which there are no differing thermal time constants present in the measurement device and thus correct measurement results can be obtained at all times during driving operation.

It has furthermore proved to be advantageous for the specific temperature coefficients of the two bridge branches to be in a very precise relationship with one another, so as to keep the air flow rate measurement signal as independent as possible from the aspirated air temperature prevailing at a particular time.

Finally, it has proved to be efficient for the individual hot wires to have the same geometric embodiment and also for them to be disposed in the air intake tube in the same position one after another. As a result, there is a partial compensation for the effect of soiling because all the hot wires become soiled at the same time and in the same manner.

Further advantages result from the application of the characteristics disclosed in the claims and specification discussed below.

The invention will be better understood and further objects and advantages thereof will become more apparent from the ensuing detailed description of two preferred embodiments taken in conjunction with the drawings.

DETAILED DESCRIPTION OF THE PREFERRED EMBODIMENTS

Figure 1:
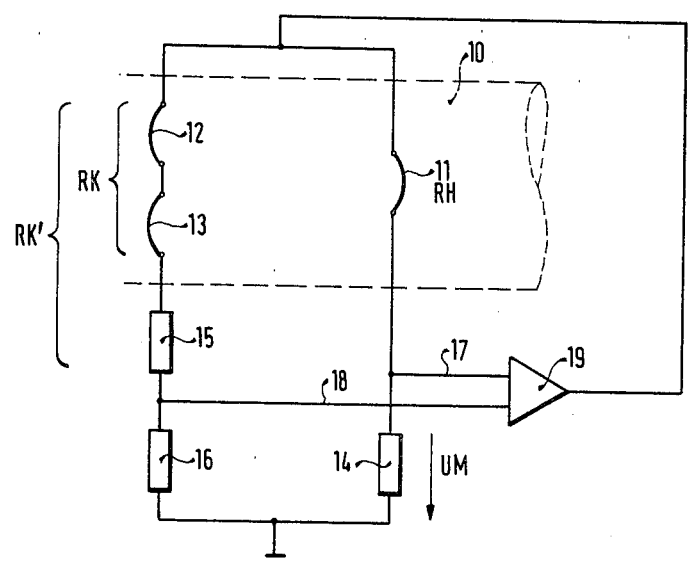
FIG. 1 shows the fundamental disposition and schematic block diagram of a bridge circuit having three hot wires according to a preferred embodiment of the invention.

Referring now to the drawings, there is shown in FIG. 1 a device for measuring the air throughput in the air intake tube of an internal combustion engine having a measurement bridge and a closed-loop electric current controller for keeping the temperature of the individual hot wires constant.

An air intake tube 10 schematically shown for an internal combustion engine has a first hot wire 11 disposed in a first branch of the measurement bridge and two further hot wires 12 and 13 in sequence in a second branch of the bridge. The bridge is completed by three further resistors 14, 15 and 16. While the supply of electric current is accomplished via the junction point of the two hot wires 11 and 12, the lower ends of the two resistors 14 and 16 are connected to ground. From the diagonal connection points of the measurement bridge, two lines 17 and 18 lead to a differential amplifier 19, which on its output side feeds power to the measurement bridge.

In the arrangement shown, the differential amplifier 19 controls the electric current through the hot wires 11–13 in a closed-loop fashion in such a way that they continuously have a constant temperature or excess temperature relative to that of the aspirated air. The difference of the hot wire temperatures should be maintained constant.

The bridge circuit shown, because of its selected dimensions, is in balance whenever the hot wire 11 (RH) has the excess temperature Tü1 and the hot wire RK, as the sum of the two hot wires 12 and 13, has the excess temperature Tü2. Because RK>RH, then Tü1>Tü2 when the hot wires are identically dimensioned.

Now if the air is considered as an ideal gas, then at air temperature changes ΔtA, there is no bridge imbalance precisely when the temperature coefficients αHO and αKO are at a predetermined relationship to one another.

On the basis of the balanced state of the bridge, the following is true:

$$RK' = RKO'[1 + \alpha KO'(tA + T\ddot{u}2)] \quad \ldots (1)$$

$$RH = RHO[1 + \alpha HO(tA + T\ddot{u}1)] \quad \ldots (2)$$

where $RKO'$ and $RHO$ are the resistance values $RK'$ and $RH$ for the temperature $t=0°$ C.

For $tA = 0°$ C., $$RK' = RKO'(1 + \alpha KO' \cdot T\ddot{u}2)$$

$$RH = RHO(1 + \alpha HO \cdot T\ddot{u}1)$$

In order for the bridge not to be imbalanced when there are changes in the aspirated air temperature tA, the following must be true:

$$\frac{\Delta RK'}{\Delta RH} = \frac{RKO' (1 + \alpha KO' \cdot T\ddot{u}2)}{RHO (1 + \alpha HO \cdot T\ddot{u}1)} \qquad (3)$$

From (1) and (2) above, the following can be obtained for $tA \neq 0$:

$$\frac{\Delta RK'}{\Delta RH} = \frac{\Delta tA\, RKO'\, \alpha Ko'}{\Delta tA\, RHO\, \alpha Ho} \qquad (4)$$

According to (3) and (4) above, $$\alpha KO' = \frac{\alpha HO}{1 + \alpha HO\, (T\ddot{u}1 - T\ddot{u}2)} \qquad (5)$$

If the temperature coefficients αKO' and αHO are established according to equation (5), which can be done as in FIG. 1 by series circuitry with a resistor 15 or by the selection of suitable wire alloys, then the excess temperatures and thus the electric current through the measuring resistor 14—the measurement voltage UM drops at this resistor—are independent from the aspirated air temperature tA.

In the known air flow rate measuring device, errors in measurement arise, especially when there are fluctuations in the aspirated air temperature, because there are differing thermal time constants. This problem is solved according to the invention because, for the bridge resistor detecting the aspirated air temperature, one or two hot wires are likewise used which have the same structural form and type as the hot wire in the measurement branch of the bridge. Because all the temperature-dependent resistors of the bridge thus have the same thermal time constants, the measurement arrangement is relatively insensitive to temperature fluctuations.

The uniformity of the temperature-dependent resistors or of the individual hot wires also has advantages in terms of manufacturing techniques, because the number of different structural components in an air flow rate measuring device can thus be reduced.

Figure 2:
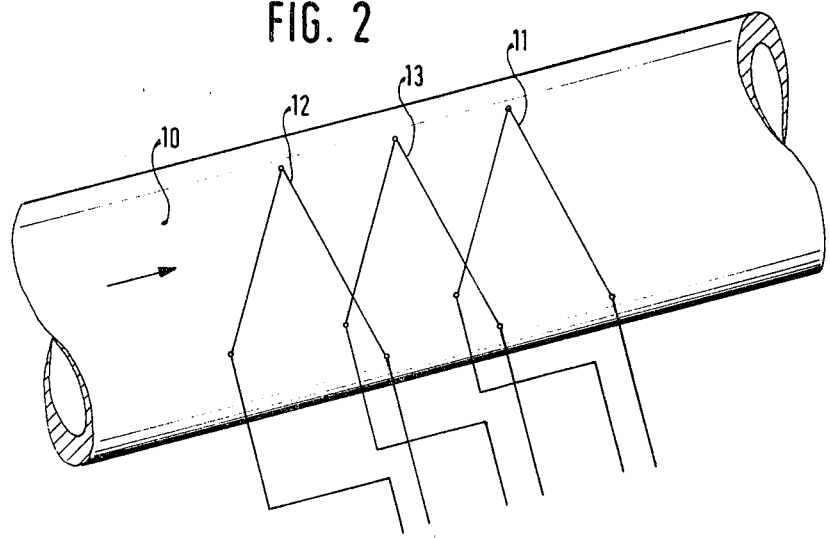
FIG. 2 is an enlarged and schematic illustration of the position of the individual hot wires in an air intake tube.

Because hot wires of the same type are used in the air intake tube, it is also possible to suspend them in a simple manner, because they are efficiently disposed one after another for reasons having to do with soiling. One example of this is shown in FIG. 2. Here, the three hot wires 12, 13 and 11 are disposed in sequence in the air intake tube 10, the hot wire 11 being disposed downstream because of its increased temperature relative to that of the hot wires 12 and 13. FIG. 2 also schematically shows a particularly simple embodiment of the hot wire suspension. For instance, the hot wire can be supported by an insulating material (not shown in FIG. 2) extending in the axial direction. For the sake of providing a generalized illustration, the various connection wires for the different hot wires 11–13 are carried out of the air intake tube 10. Naturally, individual connection points can also be connected inside the air intake tube, in order to reduce the number of cables or electric lines passing through the air intake tube.

Thus, what is essential in the device described above for air flow rate measurement in the air intake tube of an internal combustion engine is that the same hot wires are used in both bridge branches, so that there is no difference in the temperature behavior over time of the individual hot wires.

Depending on the selection of the temperature coefficients of the individual bridge members, the difference between the individual excess temperatures then also remains constant.

An example for the dimensioning of the individual bridge members is as follows:

$RH = 1.887\Omega$ $RK = 3.03\Omega$ $R14 = 4\Omega$ $R16 = 6.424\Omega$

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A device for measuring the air flow rate of the air flowing in the air intake tube of an internal combustion engine, comprising a bridge circuit having:
    at least two hot wire resistors located in different branches of the bridge circuit, and identically positioned but spatially separated in the air intake tube; and
    means for providing closed-loop electric current control and maintaining the temperature difference between the resistors constant, wherein;
    (i) The temperature of each hot wire is maintained above the temperature of the air flow; and
    (ii) The temperature coefficients of the branches containing the hot wires have the following relationship:

$$\alpha KO' = \frac{\alpha HO}{1 + \alpha HO\, (T\ddot{u}1 - T\ddot{u}2)}$$

where
   αKO' is the temperature coefficient of one of said branches of the bridge circuit;
   αHO is the temperature coefficient of the other of said branches of the bridge circuit;
   Tü1 is the excess temperature of a hot wire in said one bridge branch over the air flow temperature; and
   Tü2 is the excess temperature of at least one hot wire in said other bridge branch over the air flow temperature.

2. A device as defined in claim 1, wherein said other bridge branch has at least two electric hot wires disposed in sequence.

3. A device as defined by claim 1, wherein the individual hot wires have the same geometric embodiment.

4. A device as defined by claim 1, wherein the hot wire having the highest temperature is located downstream in the air intake tube.

* * * * *